(12) United States Patent
Raman et al.

(10) Patent No.: US 6,751,239 B2
(45) Date of Patent: Jun. 15, 2004

(54) IMMERSIVE VISUALIZATION THEATER SYSTEM AND METHOD

(75) Inventors: Lakshmi Raman, Albany, OR (US); Christopher W. Weller, Suwanee, GA (US); Thomas W. Myers, Escondido, CA (US); Jay Couch, San Jose, CA (US); Craig Paulsen, San Jose, CA (US); Thomas Wood, Mountain View, CA (US); Mark Sapper, Ramona, CA (US)

(73) Assignee: Teraburst Networks, Inc., Sunnyvale, CA (US)

( * ) Notice: Subject to any disclaimer, the term of this patent is extended or adjusted under 35 U.S.C. 154(b) by 0 days.

(21) Appl. No.: 10/265,315

(22) Filed: Oct. 7, 2002

(65) Prior Publication Data

US 2003/0076558 A1 Apr. 24, 2003

Related U.S. Application Data

(60) Provisional application No. 60/326,985, filed on Oct. 5, 2001.

(51) Int. Cl.[7] .............................................. H04L 12/28
(52) U.S. Cl. ...................................... 370/907; 370/466
(58) Field of Search ................................ 370/907, 352, 370/401, 466, 476, 356; 348/384.1, 390.1

(56) References Cited

U.S. PATENT DOCUMENTS

| | | | |
|---|---|---|---|
| 4,734,756 A | * 3/1988 | Butterfield et al. | 348/43 |
| 5,724,167 A | * 3/1998 | Sabella | 398/50 |
| 5,808,767 A | 9/1998 | Williams et al. | |
| 5,867,484 A | 2/1999 | Shaunfield | |
| 5,966,056 A | * 10/1999 | Thornton | 333/5 |
| 6,208,666 B1 | 3/2001 | Lawrence et al. | |
| 6,317,459 B1 | 11/2001 | Wang | |

OTHER PUBLICATIONS

Copy of PCT International Search Report dated Jan. 10, 2003.
Jack, Keith, "Video Demystified: A Handbook for the Digital Engineer," LLH Technology Publishing, 2002, pp. 219, 311–312, 519–556, and 557–643.
Agrawal, P., "Fiber Optic Communication Systems," Wiley, 1997, pp. 311–312.

* cited by examiner

Primary Examiner—Chau Nguyen
Assistant Examiner—Nittaya Juntima
(74) Attorney, Agent, or Firm—Katten Muchin Zavis Rosenman

(57) ABSTRACT

A system and method are disclosed for communicating multimedia information. Exemplary embodiments provide a Video-to-Optical apparatus ("$V_2O$") that can be used over either a private or a public optical network and transfers multimedia information in SONET/SDH frame format. The $V_2O$ uses SONET/SDH frames to transmit high-resolution stereoscopic images and other multimedia information through an optical network with high efficiency, high accuracy and low latency. The $V_2O$ interfaces with a visualization graphics-server on one side and the optical network on the other. The $V_2O$ apparatus can be placed in an optical network that offers an end-to-end OC 3 or higher rate circuit. A plurality of multimedia visualization centers can be coupled to the optical network. Each multimedia visualization center can include:(i) a $V_2O$ apparatus that transmits and/or receives SONET frames containing the multimedia information; and (ii) multimedia presentation equipment suitable for displaying multimedia information, such as audio, video and data.

35 Claims, 6 Drawing Sheets

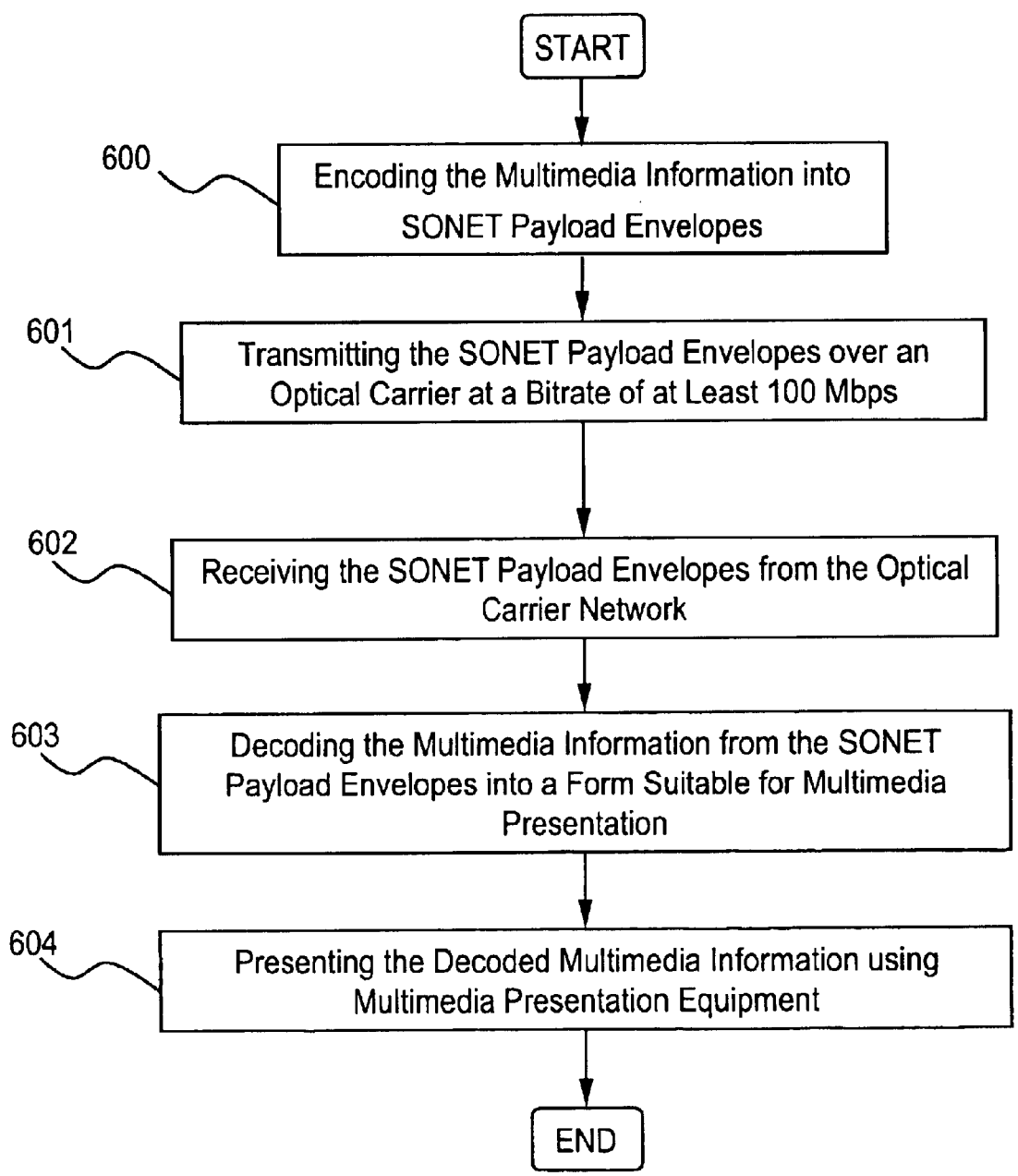

IMMERSIVE VISUALIZATION THEATER SYSTEM AND METHOD

This application claims priority under 35 U.S.C. §119 to U.S. Provisional Application No. 60/326,985, filed on Oct. 5, 2001, the entire content of which is hereby incorporated herein by reference.

BACKGROUND

1. Field of the Invention

The present invention relates to a system and method for transmitting and receiving multimedia information, including high-resolution video, audio and data, over an optical network.

2. Background Information

Immersive visualization (IV) theaters provide environments for detailed inspection of intricate images, often in three dimensions and often in true "immersive" settings. Image content can be from various fields of scientific and industrial endeavor, such as from the earth sciences, the manufacturing industry (e.g., automobile, aircraft, earth-moving vehicles), the medical industry, military and government applications, and the like. Immersive visualization theaters are typically multi-million dollar installations with sophisticated projection systems, high-end graphics servers and large, multi-terabyte data sets to be inspected. Often these data sets contain critical information requiring inspection by a group of experts that are geographically distributed. Consequently, there is a need for a collaborative solution.

A typical immersive theater comprises components such as: high-end computer graphics systems (e.g., graphics systems provided by SGI®, SUNS Microsystems, Hewlett Packard, and the like) on which the applications are hosted; sophisticated projection systems, with screens as large as several square feet to tens of square feet (e.g., projection systems provided by BARCO, Panoram Technologies, Fakespace Systems, Christie Digital Systems, Inc., and the like); and several other smaller components, such as, for example, video switches, keyboard/mouse switches, blenders, controllers, and the like.

Wide-area collaboration (i.e., information inspection by a group of experts that are geographically distributed at two or more remote sites) involves replication of the database/server at each of the remote locations and includes the transmission of control signals and "change" information between the various remote sites. In such a collaborative system, the servers at each remote site recalculate any changes and display them individually at the respective remote sites. This is especially difficult in the case of three-dimensional (3D) stereoscopic images, where the server processing power required to render the images is very high (and consequently expensive). Several problems exist with such a wide-area collaborative system. For example, there is no real-time visual collaboration between remote sites, expensive databases need to be reproduced at each center, and the databases need to be updated manually at each location. Alternatively, to avoid the multi-server scenario, the experts can travel to a single location that houses the data and collaborate locally at that location. However, this results in the inefficient use of time due to travel requirements. Consequently, the absence of connectivity and real-time data interpretation, evaluation and decision-making capability between IV islands hinders efficient collaboration.

An example of the critical nature of wide-area collaboration involves oil exploration in the oil and gas industry. Sub-surface characterization models to investigate potential drilling sites can comprise terabytes of time-elapsed multi-dimensional seismic field data. Tools for storing and displaying these data can exist at IV centers. However, the experts needed for interpreting the data for recommended drilling locations may not necessarily reside at those locations. It is estimated that a mistaken recommendation can cost upwards of several million dollars, making it paramount that the data be viewed, shared and worked on collaboratively by as many scientific and technical experts as possible. A real-time, visual collaboration tool for interpreting these data is of great benefit to this industry.

Visualization centers today are essentially communication islands without the ability to communicate with each other over large distances. This isolation has resulted from several major technological challenges, such as, for example, the inability to provide a low latency solution over long distances. As used herein, latency is defined as the time lapse between transmitting information at one site and displaying the information at a remote site.

Besides a software solution requiring databases at each collaboration location, several attempts have been made at developing hardware-based solutions based on single database locations and transport of the images, as opposed to data replication.

Transportation of the high resolution stereo images over large distances can be accomplished via optical networks. To that end, proprietary protocols or existing transport protocols can be used, along with techniques such as demultiplexing the high bandwidth data into several smaller channels for transport over different wavelengths in a DWDM (dense wavelength division multiplexing) environment. The problems encountered with these techniques include lack of synchronization and the consequent loss of image quality at the receive end. Furthermore, proprietary transport protocols are limited to deployment within local private networks, and cannot be used to transport the images over very large distances through public networks.

Proposed solutions are illustrated in FIG. 1 and represented by ovals 105, 110 and 115. In FIG. 1, latency is plotted as a function of application, with each technology represented by an oval whose location and area represents its range of applicability. Referring to the oval 105 labeled "OPTICAL (Proprietary Private Network Only)," the companies that have developed products in this segment include Lightwave Communications, Raritan International, and the like. The oval 110 labeled "Electrical" refers to connectivity within a building by electrical rather than optical means. Referring to the oval 115 labeled "OPTICAL (Packet-Based, e.g., IP Networks)," the technologies used here include the so-called "KVM extenders," where "KVM" refers to "keyboard, video, mouse." These products are typically based on packet-based Internet Protocol (IP) networks and are known to cause unacceptable latency for some applications. These KVM extenders also have restrictions based on bandwidth throughput, thereby increasing transmission time for large amounts of information.

The proposed solutions represented by ovals 105, 110 and 115 do not meet specific requirements in some markets. These requirement include, for example the ability to: (a) transmit very high resolution images (e.g., 1280×1024) bi-directionally with no artifacts and at high refresh (e.g., 112 Hz); (b) transmit such images across distances that span international boundaries; (c) display such images across multiple (e.g., three) screens; and (d) avoid duplicating data storage at the remote end. The last requirement addresses security. In many applications of IV connectivity, transmitting the actual data may not be acceptable across country borders due to the sensitive nature of the information. These requirements are in addition to the features supported by previous solutions, for example, to send control information from a keyboard, mouse, or joystick (or other similar devices), and to send multimedia information (e.g., video images, data from applications developed for use with Ethernet connections, control and stereoscopic audio, and the like).

SUMMARY OF THE INVENTION

The present invention provides an apparatus that interfaces with a visualization graphics-server on one side and the optical network on the other. This Video-to-Optical apparatus, hereinafter referred to as "$V_2O$", can be used over either a private or a public optical network and transfers the multi-media information in standard SONET/SDH framed format.

In accordance with exemplary embodiments, according to a first aspect of the present invention, the system includes an optical carrier network configured to communicate multimedia information at a bitrate of at least 100 megabits per second (Mbps). The system includes a plurality of optical network elements in the optical carrier network, wherein the combined plurality of optical network elements provide a low latency end-to-end connection. The system also includes a plurality of multimedia visualization centers, respectively coupled to the plurality of optical network elements. Each multimedia visualization center comprises multimedia presentation equipment suitable for creating and presenting multimedia information, and a visualization interface element coupled to a respective optical network element. The visualization interface element comprises a transmission element configured to encode multimedia information into optical SONET payload envelopes for transmission in the optical carrier network, and a receiver element configured to decode multimedia information from the optical SONET payload envelopes into a form suitable for multimedia presentation.

According to a second aspect of the present invention, the visualization interface element contains a transmitter and receiver. The transmitter is located at one end of a optical network line and the receiver is located at the other end.

On the transmitting end, the $V_2O$ digitizes the analog video images generated by high-end graphic computers or video transmitters, combines it with audio, control and data inputs into SONET-frames for transmission over an optical network. The SONET transmission rates used in this invention can vary between OC-3 (155 Mbps) and OC-192 (10 Gbps). As SONET is a transmission standard, these signals can be transmitted over existing public networks. Additionally, the same signals can be sent over private networks. The video data transmission rate is determined to match the appropriate signal rate for transmission such as OC-3, OC-12 and OC-48.

On the receiving end, the $V_2O$ converts the optical SONET-framed signals back into the constituent information: video, audio, control and data. The regenerated video signals are then displayed on high-resolution screens at the same rate and resolution as the source location. In summary, the $V_2O$ provides for real-time global connectivity of visualization centers using public and/or private optical networks with minimum latency achievable in a network.

In accordance with the exemplary embodiments of the present invention, the image transfer apparatus can be placed in an optical network that offers an end-to-end OC-3 or higher rate circuit. A plurality of visualization centers are coupled to the optical network. Each visualization center includes: (i) $V_2O$ apparatus that transmits and/or receives SONET frames containing the multimedia information; and (ii) multimedia presentation equipment suitable for displaying audio, video and data.

According to another aspect of the present invention, a SONET payload envelope is structured to include multimedia information to allow encoding at the transmit side and decoding on the receive side of the apparatus. The coding and decoding information provide information relating to the video resolution, refresh rate and blanking intervals in each transmitted SONET frame to accurately synchronize pixel clocks between the transmitter and the receiver elements.

In still another embodiment, MPEG Video Compression techniques and/or Video Frame Dropping Algorithms are supported at the transmission rates of interest, (OC-3 or higher) by the $V_2O$ apparatus. Compression techniques allow for the transmission of data using a smaller bitrate, and frame dropping algorithms allow the dropping of one out of N video screens. According to exemplary embodiments, high-resolution images with the appropriate algorithm are transmitted using SONET/SDH through a fiber optic network with a quality of service that supports the lowest possible latency on the path connecting the visualization centers.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein:

FIG. 6 is a flowchart illustrating steps for communicating multimedia information, in accordance with an exemplary embodiment of the present invention.

DETAILED DESCRIPTION OF THE PREFERRED EMBODIMENTS

Figure 1:
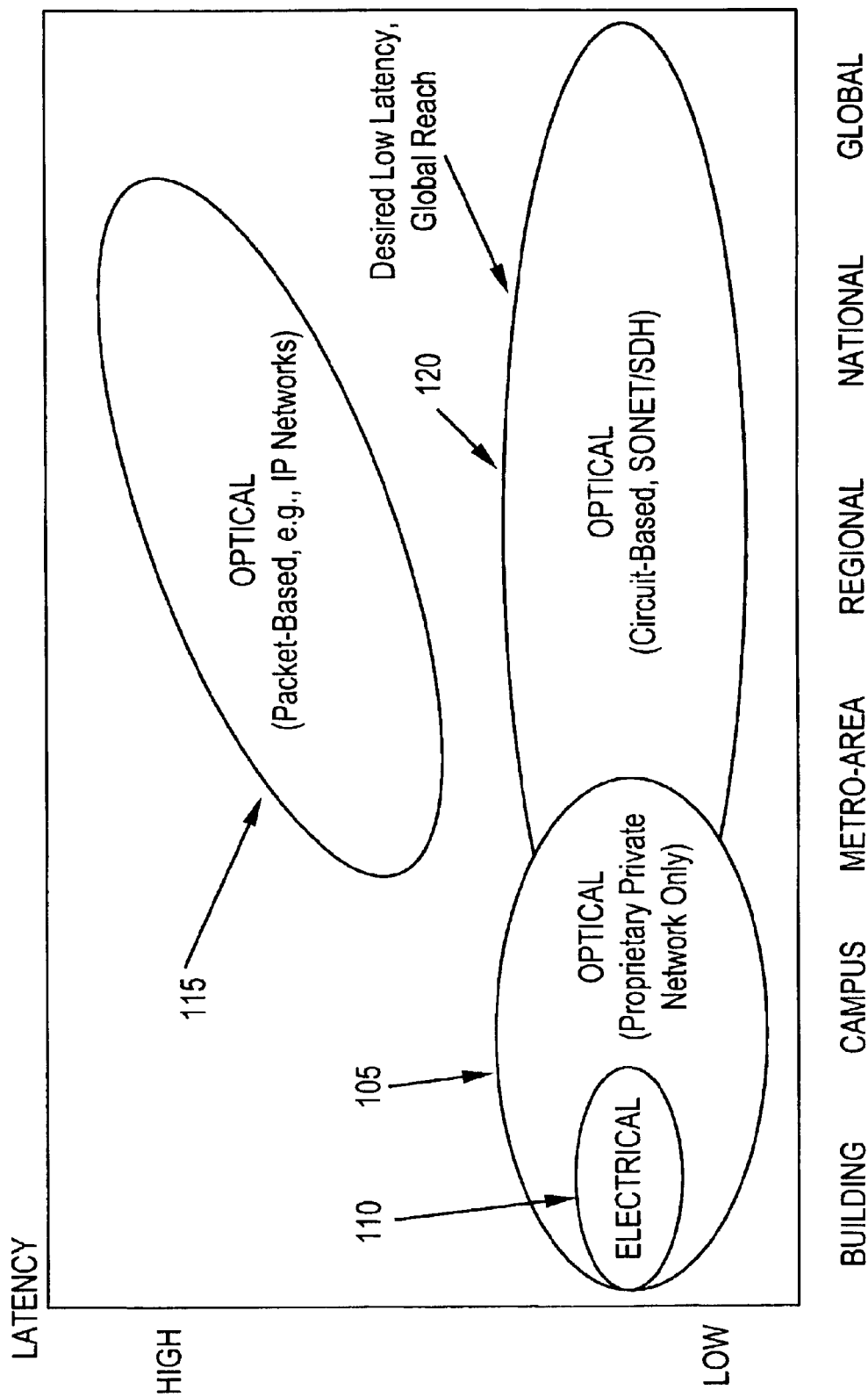
FIG. 1 is an applications diagram illustrating applicable regions of various network technologies for transmitting information versus the latency of each of the various network technologies.

A system and method are disclosed for communicating multimedia information. Exemplary embodiments of the present invention provide a Video-to-Optical apparatus, hereinafter referred to as "$V_2O$," that can be used over private and/or public optical networks and transfers multimedia information in SONET/SDH frame format. The $V_2O$ uses SONET/SDH frames to transmit high resolution stereoscopic images and other multimedia information through an optical network with high efficiency, high accuracy and low latency. The $V_2O$ apparatus can be placed in an optical carrier network that offers, for example, an end-to-end OC-3 or higher rate circuit. A plurality of multimedia visualization centers can be coupled to the optical carrier network. Each multimedia visualization center can include, for example:(i) a $V_2O$ apparatus that transmits and/or receives SONET frames containing the multimedia information; and (ii) multimedia presentation equipment suitable for displaying and transmitting multimedia information, such as audio, video and data.

As used herein, "multimedia information" can include, for example, video information, audio information, data, control signals (e.g., from a computer keyboard, mouse, joystick or similar device), or any other type of data or information (e.g., graphics, animation, textual information, and the like) that can be carried over a network and displayed or otherwise presented to users, or used to display or otherwise present such data or information to users.

According to an exemplary embodiment, on the transmitting end, the $V_2O$ can digitize the analog video images generated by, for example, high-end graphic computer systems or other video transmitters, combine the digitized video information with audio, control and data inputs into SONET frames for transmission over an optical network. The SONET transmission rates can vary between, for example, OC-3 (155 Mbps) and OC-192 (10 Gbps). As SONET is a transmission standard, these signals can be transmitted over existing public networks. Additionally, the same signals can be sent over private networks. The multimedia information transmission rate is determined to match the appropriate signal rate for transmission, such as, for example, OC-3, OC-12, OC-48 and OC-192.

On the receiving end, the $V_2O$ converts the optical SONET-framed signals back into the constituent multimedia information, for example, video, audio, control and data information. The regenerated video signals can then be displayed on, for example, high-resolution screens at the same rate and resolution as at the source location. In summary, the $V_2O$ provides for real-time global connectivity of visualization centers using combinations of public and/or private optical networks with minimum latency achievable in an optical carrier network.

According to another aspect of the present invention, a SONET payload envelope is structured to include multimedia information to allow encoding of the multimedia information in the SONET payload envelope at the transmit side and decoding of the multimedia information from the SONET payload envelope on the receive side of the apparatus. Based on the available transmission rate (e.g., OC-3 or higher), MPEG Video Compression techniques and/or Video Frame Dropping Algorithms techniques are supported by the $V_2O$ apparatus. MPEG Video Compression techniques are described in, for example, Keith Jack, "Video Demystified: A Handbook for the Digital Engineer," LLH Technology Publishing, Eagle Rock, Va. (2001), pages 519–556 (for MPEG1 Video Compression), and pages 557–643 (for MPEG2 Video Compression). Video Frame Dropping Algorithms are described in, for example, the aforementioned Keith Jack, "Video Demystified: A Handbook for the Digital Engineer," page 219. For example, compression techniques allow the transmission of data using a smaller bitrate, and frame-dropping algorithms allow the dropping one out of N video screens. According to exemplary embodiments, the transmission of high-resolution images through a fiber optic network can be achieved using SONET/SDH with a quality of service that supports the lowest possible latency on the path connecting the visualization centers.

Block Diagram of the $V_2O$ System

Figure 2:
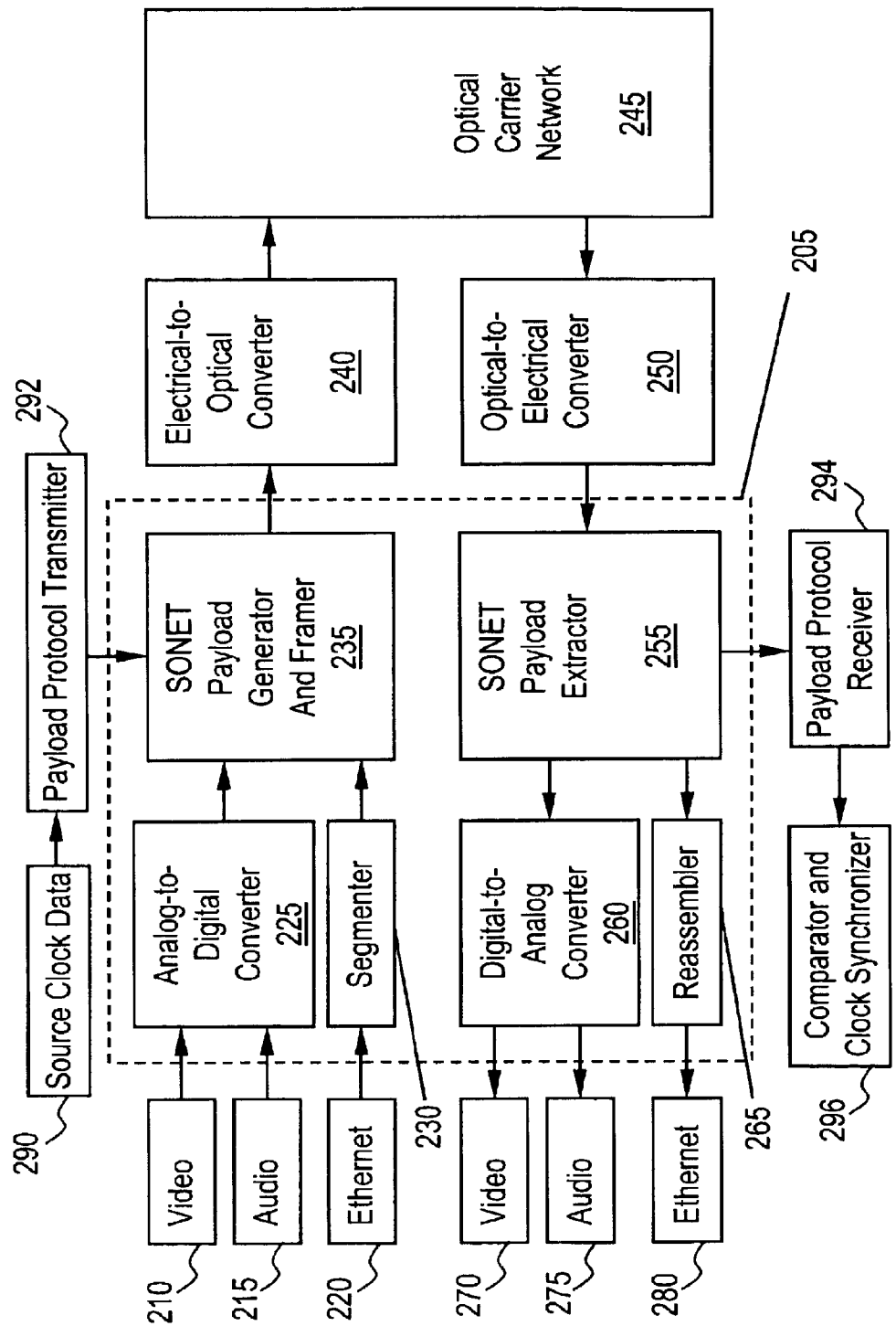
FIG. 2 is a block diagram illustrating a system for communicating multimedia information over an optical network using SONET frames, in accordance with an exemplary embodiment of the present invention.

These and other aspects of the present invention will now be described in greater detail. FIG. 2 is a block diagram illustrating a system for communicating multimedia information over an optical network using SONET, in accordance with an exemplary embodiment of the present invention.

The $V_2O$ 205 is the key linkage in transmitting and receiving high definition stereo video, audio and data inputs that are imposed on a high bandwidth fiber optic network. The $V_2O$ boundaries are shown by the dotted rectangle in the figure. The $V_2O$ 205 will be alternatively referred to as a "visualization interface element" in the following description.

A high-definition video input 210, with an option of, for example, stereoscopic video, can be sent to an Analog-to-Digital Converter 225 inside the $V_2O$ 205, where the high-definition video input 210 can be combined with an associated stereo audio input 215. The combination of high definition video and audio can form multimedia information. Ethernet data input 220 can sent to a Segmenter 230 inside the $V_2O$ 205, where the Ethernet data is segmented into appropriate packet sizes, as is well known in the state of the art for packetized data. The outputs from the Analog-to-Digital Converter 225 and the Segmenter 230 are sent to the SONET Payload Generator and Framer 235, where the SONET frame composed of video, audio, data and control information is formatted.

Electrical signals generated from the SONET Payload Generator and Framer are sent to the Electrical-to-Optical Converter 240, which is a combination of a laser and modulator known to the state of the art and that transfers the electrical signals to optical signals in SONET format that can be sent directly into the Optical Carrier Network 245 through a fiber optic cable. The optical carrier network 245 can employ Dense Wavelength Division Multiplexing (DWDM) for communicating multiple wavelengths of light over a single fiber. The optical carrier network 245 can be configured as, for example, a mesh structure, a ring structure, a tree structure, or any other network topology.

The optical signals in SONET format sent through the optical carrier network 245 can be received at an Optical-to-Electrical Converter 250, where the optical signals are converted to electrical signals by the use of a photodetector, which is known to the state of the art. The electrical signals from the Optical-to-Electrical Converter are passed to a SONET Payload Extractor 255, which extracts the payload and passes it on to the Digital-to-Analog Converter 260, which forms analog video and audio signals by known methods, and then sends this analog information to the outputs of Video 270 and Audio 275. The analog video signals from Video 270 are sent to a stereoscopic visual display and the analog audio signals from Audio 275 are sent to stereo audio speakers, located in a multimedia visualization center. The electrical signals from the Optical-to-Electrical Converter 250 are also passed to a Reassembler 265 where the packets are reassembled by means known in the state of the art and then are passed to the Ethernet output 280, which has its own display in the multimedia visualization center.

Besides the flow of video input 210, audio input 215 and Ethernet data input 220 information described above, there is another flow of protocol information which is used for synchronizing transmitter and receiver clocks, even though they may be several kilometers apart. At the transmitting end, the Source Clock Data 290 is sent into a Payload Protocol Transmitter 292, where this information is passed into the SONET Payload Generator and Framer 235, where it is coded and combined with the video, audio and ethernet in the same SONET format. At the receiving end, the SONET Payload Extractor 255 passes part of the signals to the Payload Protocol Receiver 294 which decodes and thereby detects the payload protocol. This is then sent to the Comparator and Clock Synchronizer 296, which synchronizes the transmitter and receiver clocks and thereby allows transmission of multimedia information at high data rates over large distances with minimal errors.

The $V_2O$ External Interface

Figure 3:
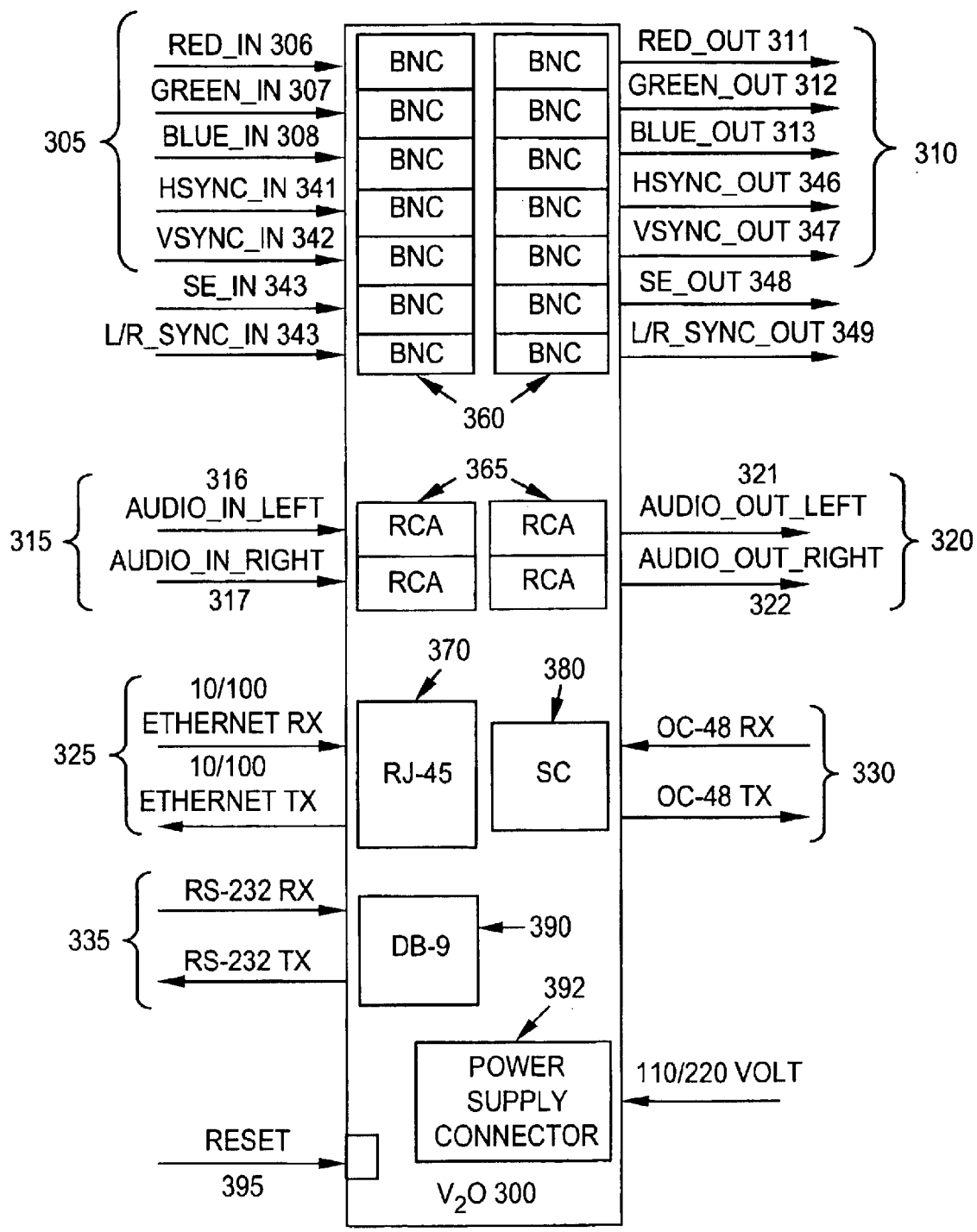
FIG. 3 is a block diagram illustrating the external interface of a Video-to-Optical ($V_2O$), in accordance with an exemplary embodiment of the present invention.

FIG. 3 is a block diagram illustrating the external interface of a $V_2O$ Visualization Interface Element, in accordance with an exemplary embodiment of the present invention. In this embodiment, the $V_2O$ can be a receiver RX of, for example, OC-48 or a transmitter TX of, for example, OC-48, as shown in the bidirectional port 330. As shown in FIG. 3, the $V_2O$ 300 can include one channel of Video IN 305 with three input colors red 306, green 307, and blue 308. The $V_2O$ 300 can also include one channel of Video OUT 310 with three output colors red 311, green 312, and blue 313. The $V_2O$ 300 can include one channel of stereo Audio IN 315, including left and right input audio channels 316 and 317, respectively. The $V_2O$ 300 can include one channel of stereo Audio OUT 320, including left and right output audio channels 321 and 322, respectively. The $V_2O$ 300 can include one bi-directional 10/100 Mbps Ethernet port 325, a bidirectional OC-48 port 330, and one serial port 335. According to an exemplary embodiment, the serial RS-232 port 335 can be located on the front panel of the $V_2O$ 300. In addition, there are horizontal and vertical synchronization inputs 341 and 342, respectively, and horizontal and vertical synchronization outputs 346 and 347, respectively.

The Video IN 305 and Video OUT 310 signals use five BNC (RGBHV) connectors 360. In addition to RGBHV, there are input and output stereo emitter signals 343 and 348, respectively, and input and output left/right sync signals 344 and 349, respectively, that each use a BNC connector 360. The input and output stereo emitter signals 343 and 348 are used to sync the left eye and right eye signals with stereoscopic glasses through the stereo emitter located near the monitor or display of the multimedia presentation equipment. The stereo Audio IN 315 and Audio OUT 320 signals use RCA connectors 365. The bi-directional 10/100 Ethernet port 325 uses RJ-45 connector 370 and the OC-48 port 330 uses a SC-type fiber optic connector 380. The serial RS-232 port 335, used as, for example, a debug console port, uses a male DB9 connector 390 and can be wired as a DTE interface so that it can be used with, for example, a modem. A reset button 395 can be provided to bring the system into reset mode. A 110/220 volt power supply connector 392 is provided to supply power for the system. The $V_2O$ 300 can also include a connection for the keyboard/mouse/joystick (or other computer input device) control to enable, for example, remote manipulation of the multimedia information.

The Ethernet port 325 can be used, for example, for video conferencing. According to an exemplary embodiment, allocation of bandwidth amongst video, audio and Ethernet data can be chosen such that less than ten percent of the fiber optic bandwidth is allocated to Ethernet data, with the remainder of the bandwidth being allocated to the video and audio portions. For example, a 10 Mbps Ethernet occupies 0.4 percent of an OC-48 bandwidth of 2.5 Gbps.

$V_2O$ Protocol Definition

One example of protocol definition used to delineate the different multimedia information will be described with reference to FIG. 4 in support of OC-48c rate. This definition does not include the control information that would be sent when a keyboard/mouse control is included in the system. The assignment of bandwidth to video, audio and data are defined assuming OC-48c. More than one frame is shown in FIG. 4 to demonstrate how a transmitted video screen can overlap OC-48c boundaries.

Figure 4:
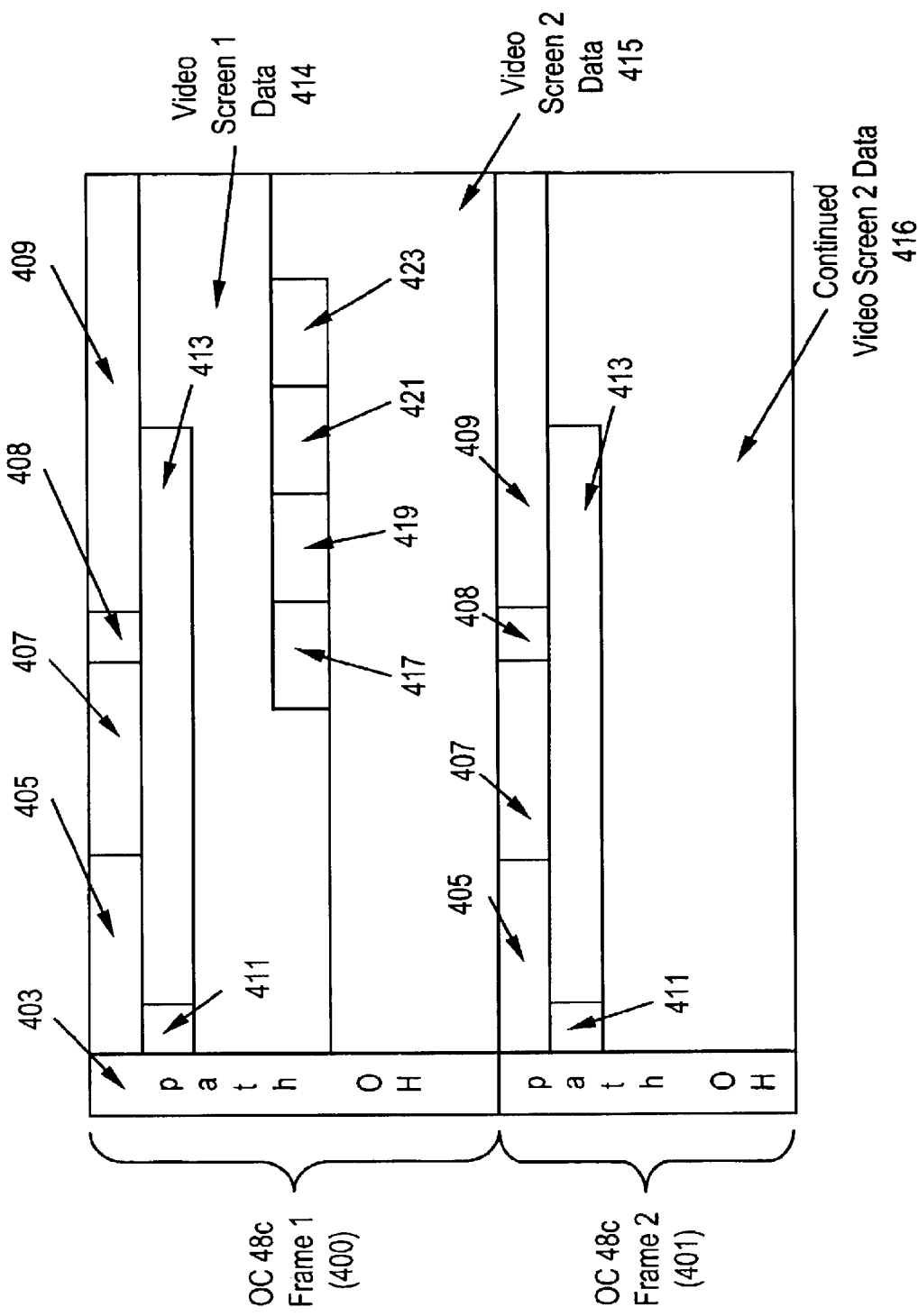
FIG. 4 is a schematic diagram of SONET frames containing video, audio, and Ethernet information in the payload, in accordance with an exemplary embodiment of the present invention.

The SONET payload protocol is shown in FIG. 4. Two frames of OC-48c are shown in the figure as Frame 1 400 and Frame 2 401. Beginning all frames is the path overhead 403. Starting from the upper left of OC 48c Frame 1, the first four bytes 405 following the path overhead 403 in Frame 1 are reserved, and will not carry valid data for this definition. The fourth through the eighth byte is the Drop Timecode byte 407, used for the drop pixel clock recovery software. The ninth byte is a Video Present Tag 408, which will denote when there is valid video screen data in the payload. Following the Video Present Tag 408 is the Audio Data section 409, that is six 32-bit words long. Following the Audio Data section 409 is the LAN Count Tag 411, that carries an 8-bit hexadecimal count of the valid LAN bytes in the LAN data section. This is followed by the LAN data section 413, that is forty 32-bit words long. Following the LAN data section is the Video Screen 1 Data 414, that extends to the end of the STS-48c Frame 1 400. The maximum content of the Video Screen Data is a total of 12,144 24-bit words long, that can be wrapped around several SONET frames. In FIG. 4, the data is wrapped around OC 48c Frame 1 400 and OC 48c Frame 2 401. The Video Data Screen 1 section 414 ends at the End of Video Screen Tag 417. For example, the End of Video Screen Tag 417 can be 0×555555 (hexadecimal) to denote the end of a video screen. In general, the video screen data section can contain the start of a screen, the end of a screen, or data in the middle of the screen. In FIG. 4, the video data ends in the middle of OC 48c Frame 1 400.

The start of the next video screen, that is a continuation of OC 48c Frame 1 400, is designated by a Start of Video Screen Tag 419. For example, Start of Video Screen Tag 419 can be either 0×AAAAAA (hexadecimal) if left or mono video screen, or 0×BBBBBB (hexadecimal) if right video screen. This is followed by a Screen Type Look-Up Table 421, that can be a 16-bit hexadecimal number that corresponds to the type of screen. This is followed by a Pixel Clock Count Tag 423, that can be a 32-bit hexadecimal number that can be used to represent the pixel clock count. This is followed by Video Screen 2 Data 415, that is a continuation of Video Screen 1 Data 414. The continuation of Video Screen 2 Data 415 appears in OC 48c Frame 2 401 as Continuted Video Screen 2 Data 416.

The frame structure according to exemplary embodiments allows for fixed bandwidth for the Video, Audio, and LAN traffic of 2.38 Gbps, 1.54 Mbps, and 10.24 Mbps, respectively, to occupy the bandwidth for STS-48c. For other rates, different bandwidths are allocated.

The $V_2O$ functions of FIG. 4 can be implemented in hardware with embedded software offering OC-48 transmit and receive interfaces.

The $V_2O$ apparatus can support a number of combinations of resolution and refresh rates. The apparatus is configurable to allow a user to select from a range of resolutions including, but not limited to, VGA, SXGA (1280×1024), and XGA (1024×768) among others. Similarly the refresh rates can be selected from 30 Hz to 120 Hz, where the higher refresh rates are needed for stereoscopic images. Also, the system can be used with external converters to allow for RGsB (sync on green) or RGBS (composite sync).

A multimedia display, such as that shown in block diagram in FIG. 2 is used to project images generated from a local graphics computer or received from a remote center. In order to determine the techniques suitable for matching the capacity required for the multimedia information with the available bandwidth, consider the following example: Total pixels per horizontal line=1,280; Total number of lines per frame=1,024; Total number of pixels per frame=1,280× 1024=1,310,720; Total number of pixels per second=1,310, 720×72=94,371,840. According to this example, if the color depth of R, G and B is 8 bits each, then the total number of bits per second=94,371,840*8*3=2.26 GBps.

There are several well-known techniques in the industry for reducing the required bandwidth for high resolution and high refresh rate multi-media information. Details of these techniques are described in, for example, in Govind P. Agrawal, "Fiber Optic Communication Systems," Wiley, N.Y. (1997), pages 311–312, and in the aforementioned Keith Jack, "Video Demystified: A Handbook for the Digital Engineer," page 219, 519–556, and 311–312. Some of these include: (i) RGB color depth reduction; (ii) RGB-to-YUV and YUV-to-RGB conversions; (iii) Frame dropping, where image is displayed at the same rate as the original, but transmission rate is reduced by not transmitting all the frames; (iv) Split/De-multiplex Right Eye and Left Eye image, and compress them separately using commercially available cores such as MPEG2; and (v) MPEG2-Standard based cores, which are also available commercially to support high resolution and high refresh rate video compression.

Exemplary embodiments of the present invention utilize a combination of the aforementioned techniques so that the transmitted multimedia information can meet the transmission bandwidth available at the multimedia visualization centers being connected together (example OC-3 or OC-12) and result in visually lossless displays. Some of the challenges include the support for stereo with a commercially available MPEG-core, maintaining the high fidelity of the image at the remote end e.g., no flicker), latency introduced from processing the image by the transmitter and receiver elements, and choosing the compression ratio that will result in visually lossless display.

Auto Detection of Video Configuration

Two important aspects of configuration are refresh rate and resolution. The refresh rate is the rate at which a new screen is projected on a monitor's CRT screen. It is typically on the order of Hertz, and is reflected in the frequency of the VSYNC signal, which comes directly from any standard video card.

The resolution of the screen can be found by counting the number of HSYNC pulses (another signal that comes directly from the video card) that occur between VSYNC pulses. HSYNC denotes when a new line of pixels is to be projected onto a monitor's CRT screen. When a VSYNC pulse arrives, the monitor starts at the top of the screen, and when an HSYNC pulse arrives, the monitor starts at the beginning of a new line. Using a counter that runs off of a known clock with fixed frequency (e.g., 77 MHz), the number of clock cycles between rising edges of VSYNC, and the number of HSYNCs between VSYNCs are counted. Finally, a counter also counts up the time between HSYNC pulses. All of these counts can be used to determine the screen resolution.

Synchronizing Clocks Between Add and Drop Sides of the Video

Because the video data at add and the drop side must be identical, the screen resolution and refresh rate must be sent from the source to the destination $V_2O$ system. This can be achieved by different methods, for example, either via a reference to stored configuration information of the parameters in the two systems or sending the actual parameters in the SONET frame. However, having the same refresh rate and screen resolution is not sufficient to reproduce the video perfectly. The drop side pixel clock must be at the exact same frequency, and have a fixed phase relationship to the add side pixel clock. The system must therefore provide a phase-locking mechanism for the two pixel clocks. This phase locked loop is provided by using a filed programmable gate array (FPGA), the receive side processor, and a frequency synthesizer IC.

The FPGA will keep a counter running off of the add side Pixel Clock, which will be latched during every SONET frame transmission, and sent across on the SONET frame. The drop side will keep a similar counter, but it is incremented by the output of the frequency synthesizer (the drop side Pixel Clock). When a new value of the add counter is extracted from the Pixel Clock Count information in the SONET payload, it is compared to the drop side counter. If it is greater than the drop side counter, then the frequency synthesizer is sped up, if it is less than the drop side counter, then the synthesizer is slowed down. This process is repeated at the beginning of every SONET frame, to ensure that the Pixel clocks stay phase locked.

Network Integration

Figure 5:
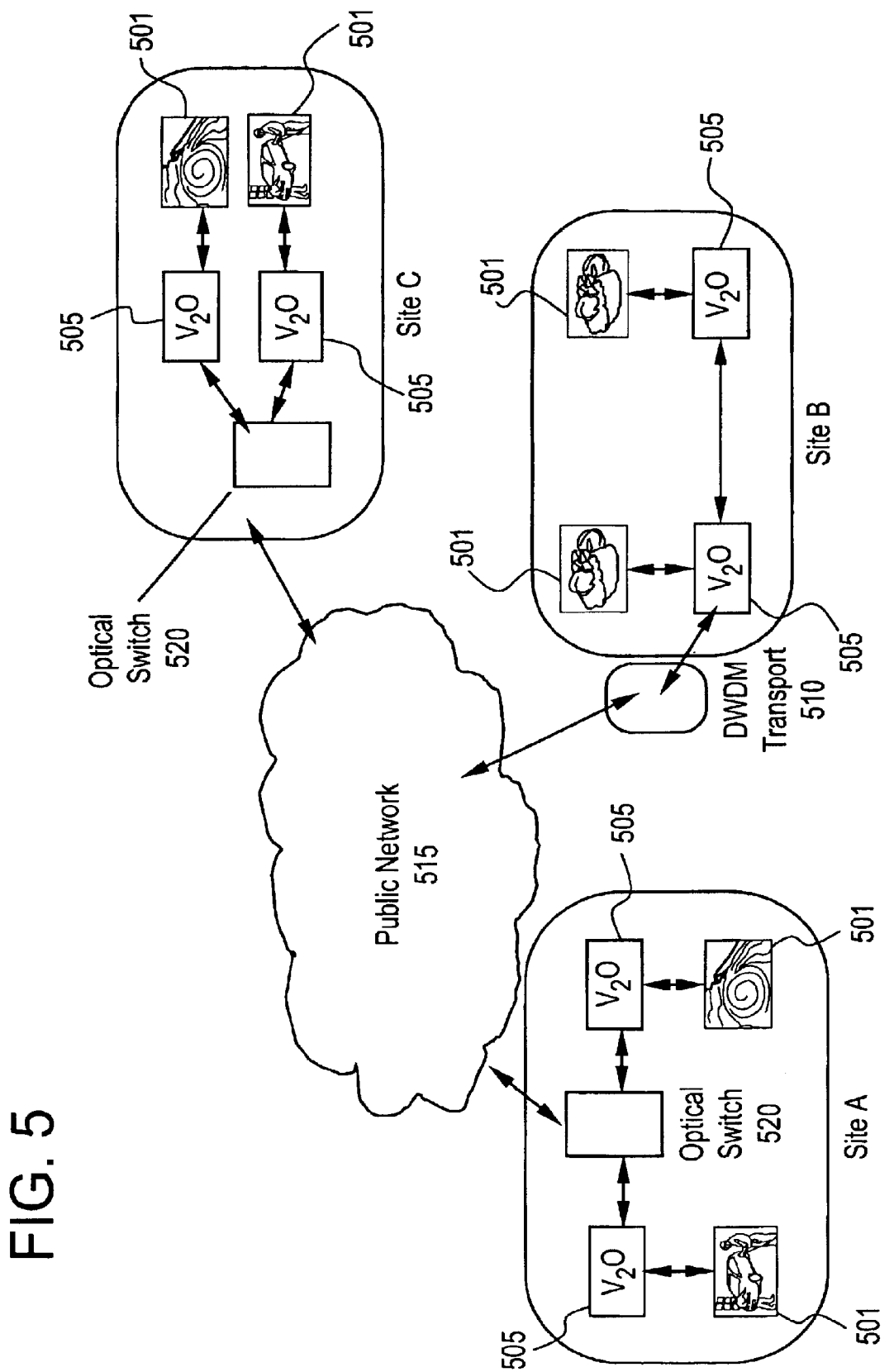
FIG. 5 is a block diagram of a multimedia visualization network connected by $V_2O$ equipment, in accordance with an exemplary embodiment of the present invention.

FIG. 5 is a block diagram of a multimedia visualization network connected by $V_2O$ equipment, in accordance with an exemplary embodiment of the present invention. In FIG. 5, a plurality of $V_2O$ equipment 505, alternatively referred to as "visualization interface elements," are connected to optical networking DWDM equipment 510 for switching and transport of optical signals to and from a public network 515. The multimedia displays 501 are generally connected to the $V_2O$ equipment 505, such that there is one multimedia display for each $V_2O$ 505. For purposes of illustration and not limitation, the optical switches 520, sometimes called optical cross-connect switches O×Cs, can be used at Sites A and C, whereas a simpler non-switched means 510 for DWDM transport is used at Site B. O×Cs are described in, for example, the aforementioned Govind P. Agrawal, "Fiber Optic Communication Systems," pages 311–312. However, any number of sites can be configured for use in the network depicted in FIG. 5, with each site using any type of optical switch and transport network elements. In the public network 515, appropriate SONET circuits (e.g., OC-3, OC-12, OC-48, OC-192, and the like) can be provisioned to the destination sites. Alternatively, within local sites A, B and C, the $V_2O$ equipment 505 can be connected directly to each other, without need for a public network 515, for collective transfer of multimedia and Ethernet data information over a distance of up to 100 km.

In a broadcast configuration, an optical switch 520 at Site A can transmit, for example, two optical signals through the public network 515 to the two destinations shown in FIG. 5 as Sites B and C. Individual $V_2O$ equipment located at a particular site can be connected in parallel, as in, for example, Sites A and C, or in series, as in, for example, Site B.

Flow Diagram

A flow diagram is shown in FIG. 6 that describes a method of transmitting and receiving multimedia information flow through an optical network with low latency and high bandwidth using SONET. The successive steps are as follows: (a) Encoding (600) the multimedia information into SONET payload envelopes; (b) Transmitting (601) the SONET payload envelopes over an optical rarrier network at a bitrate of at least 100 MBps; (c) Receiving (602) the SONET payload envelopes from the optical carrier network; (d) Decoding (603) the multimedia information from the SONET payload envelopes in a form suitable for multimedia presentation, and (e) Presenting (604) the decoded multimedia informaiton using multimedia presentation equipment.

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A system for communicating multimedia information, comprising:
    an optical carrier network configured to communicate multimedia information;
    a plurality of optical network elements in the optical carrier network, wherein the plurality of optical network elements provide a low latency end-to-end connection; and
    a plurality of multimedia visualization centers, respectively coupled to the plurality of optical network elements, each multimedia visualization center comprising:
        multimedia presentation equipment suitable for creating and presenting multimedia information; and
        a visualization interface element coupled to a respective optical network element, the visualization interface element comprising:
            a transmitter element configured to encode multimedia information into SONET payload envelopes of a plurality of SONET frames for transmission in the optical carrier network,
                wherein the transmitter element adds coding information to each of the plurality of SONET frames,
            a receiver element configured to decode multimedia information from the SONET payload envelopes into a form suitable for multimedia presentation,
                wherein the receiver element decodes the coding information, and
                wherein the coding information provides information relating to video resolution, refresh rate and blanking intervals in each of the plurality of SONET frames to synchronize pixel clocks between the transmitter element and the receiver element.

2. The system of claim 1, wherein each multimedia visualization center comprises a display having a plurality of display sections.

3. The system of claim 1, wherein the optical carrier network comprises a plurality of fiber optic links, capable of transmitting and receiving SONET signals, and wherein the optical carrier network employs Dense Wavelength Division Multiplexing (DWDM).

4. The system of claim 1, wherein the optical carrier network comprises one of a mesh, ring and tree structure.

5. The system of claim 1, wherein the visualization interface element is configured to transmit and receive at least one of video signals, audio signals, Ethernet data and control signals in the SONET payload envelopes.

6. The system of claim 5, wherein the control signals comprise at least one of keyboard-generated control signals, mouse-generated control signals, and joystick-generated control signals.

7. The system of claim 1, wherein the visualization interface element is configured to output to the multimedia presentation equipment at least one of: (i) stereoscopic synchronized video signals, (ii) audio signals synchronized to the video signals, (iii) control data and (iv) Ethernet data.

8. The system of claim 1, wherein the visualization interface element is configured to utilize at least one of data compression, an image color quality and a frame dropping option to optimize the multimedia information to be transmitted, based upon an available bandwidth of the optical carrier network.

9. The system of claim 1, wherein at least one of the plurality of optical network elements comprise optical crossconnect (OXC) switches.

10. The system of claim 1, wherein a visualization interface element is coupled to a respective optical network element using a fiber optic connection, and wherein the fiber optic connection between the visualization interface element and a respective optical network element uses a single mode fiber.

11. The system of claim 1, wherein the optical carrier network is configured to communicate multimedia information at a bit rate of at least 100 megabits per second.

12. A visualization interface element for use in an optical carrier network, comprising:
    a transmitter structure configured to encode multimedia information into SONET payload envelopes for transmission in the optical carrier network,
        wherein the transmitter structure adds coding information to a plurality of SONET frames; and
    a receiver structure configured to decode multimedia information from the SONET payload envelopes for multimedia presentation,
        wherein the receiver structure decodes the coding information, and
        wherein the coding information provides information relating to video resolution, refresh rate and blanking intervals in each of the plurality of SONET frames to synchronize pixel clocks between the transmitter structure and the receiver structure.

13. The visualization interface element of claim 12, wherein the transmitter structure is configured to transmit multimedia information at a bit rate of at least 100 megabits per second.

14. The visualization interface element of claim 12, wherein the receiver structure is configured to receive multimedia information at a bit rate of at least 100 megabits per second.

15. The visualization interface element of claim 12, wherein the multimedia information comprises at least one of video signals, audio signals, Ethernet data and control signals.

16. The visualization interface element of claim 12, comprising an output structure for outputting at least one of (i) stereoscopic synchronized video signals, (ii) audio signals synchronized to the video signals, (iii) control data and (iv) Ethernet data.

17. The visualization interface element of claim 12, comprising an optimization structure, wherein the optimization structure utilizes at least one of a data compression, an image color quality and a frame dropping option to optimize the multimedia information to be transmitted, based upon an available bandwidth of the optical carrier network.

18. The visualization interface element of claim 12, wherein the visualization interface element is coupled to the optical carrier network via one of a plurality of optical network elements, wherein the visualization element is coupled to a respective optical network element using a fiber optic connection, and wherein the fiber optic connection between the visualization interface element and the respective optical network element uses a single mode fiber.

19. The visualization interface element of claim 18, wherein at least one of the optical network elements comprises an optical cross-connect (OXC) switch.

20. A visualization interface element, for use in an optical carrier network, that transmits and receives multimedia information, comprising:
  a transmitter element configured to accept multimedia information from multimedia equipment, to transfer the multimedia information to a framed SONET payload, and to convert electrical signals to optical signals for transmission over the optical carrier network,
    wherein the transmitter element adds coding information to each of a plurality of SONET frames; and
  a receiver element configured to convert optical signals to electrical signals, to extract multimedia information from a framed SONET payload, and to send the extracted multimedia information to multimedia equipment,
    wherein the receiver element decodes the coding information, and
    wherein the coding information provides information relating to video resolution, refresh rate and blanking intervals in each of the plurality of SONET frames to synchronize pixel clocks between the transmitter element and the receiver element.

21. The visualization interface element of claim 20, wherein the multimedia equipment comprises three projectors, each projector responding to a different input RGBHV video signal.

22. The visualization interface element of claim 20, wherein the visualization interface element is configured to utilize at least one of a data compression, an image color quality and a frame dropping option to optimize the multimedia information to be transmitted, based upon an available bandwidth of the optical carrier network.

23. The visualization interface element of claim 20, comprising an output structure for outputting at least one of (i) stereoscopic synchronized video signals, (ii) audio signals synchronized to the video signals, (iii) control data and (iv) Ethernet data.

24. The visualization interface element of claim 20, wherein the visualization interface element is coupled to the optical carrier network via one of a plurality of optical network elements, and wherein at least one of the plurality of optical network elements comprise optical cross-connect (OXC) switches.

25. The visualization interface element of claim 20, where in the visualization interface element transmits and receives multimedia information at a bit rate of at least 100 megabits per second.

26. A method for communicating multimedia information, comprising the steps of:
  encoding the multimedia information into SONET payload envelopes of a plurality of SONET frames;
  encoding video format information into each of the plurality of SONET frames, wherein the video format information comprises resolution, refresh rate and blanking interval;
  transmitting the plurality of SONET frames over an optical carrier network at a bit rate of at least 100 megabits per second;
  receiving the plurality of SONET frames from the optical carrier network;
  decoding the multimedia information from the SONET payload envelopes of the plurality of SONET frames into a form suitable for multimedia presentation;
  decoding the video format information from each of the plurality of SONET frames;
  synchronizing a transmitter pixel clock and a receiver pixel clock using the coded and decoded video format information; and
  presenting the decoded multimedia information using multimedia presentation equipment.

27. A method of communicating multimedia information, comprising the steps of:
  encoding the multimedia information into SONET payload envelopes of a plurality of SONET frames;
  encoding multimedia coding information into each of the plurality of SONET frames,
    wherein the multimedia coding information is associated with at least one of video resolution, refresh rate and blanking intervals;
  transmitting the plurality of SONET frames over an optical carrier network;
  receiving the plurality of SONET frames from the optical carrier network;
  decoding the multimedia information from the SONET payload envelopes into a form suitable for multimedia presentation;
  decoding the multimedia coding information from each of the plurality of SONET frames;
  synchronizing a transmitter pixel clock and a receiver pixel clock using the multimedia coding information; and
  presenting the decoded multimedia information using multimedia presentation equipment.

28. The method of claim 27, wherein the multimedia presentation equipment includes a display comprising a plurality of display sections.

29. The method of claim 27, wherein the optical carrier network comprises a plurality of fiber optic links capable of transmitting and receiving SONET signals, and wherein the optical carrier network employs Dense Wavelength Division Multiplexing (DWDM).

30. The method of claim 27, wherein the optical carrier network comprises one of a mesh, ring and tree structure.

31. The method of claim 27, wherein the multimedia information comprises at least one of video signals, audio signals, Ethernet data and control signals.

32. The method of claim 31, wherein the control signals comprise at least one of keyboard-generated control signals, mouse-generated control signals, and joystick-generated control signals.

33. The method of claim 27, wherein the step of presenting comprises the step of:
  transmitting to the multimedia presentation equipment at least one of: (i) stereoscopic synchronized video signals, (ii) audio signals synchronized to the video signals, (iii) control data and (iv) Ethernet data.

34. The method of claim 27, comprising the step of:
  utilizing at least one of a data compression, an image color quality and a frame dropping option to optimize the multimedia information to be transmitted, based upon an available bandwidth of the optical carrier network.

35. The method of claim 27, wherein the plurality of SONET frames are transmitted over the optical carrier network at a bit rate of at least 100 megabits per second.

* * * * *